United States Patent
Hong et al.

(10) Patent No.: US 10,521,013 B2
(45) Date of Patent: Dec. 31, 2019

(54) HIGH-SPEED STAGGERED BINOCULAR EYE TRACKING SYSTEMS

(71) Applicant: Samsung Electronics Co., Ltd., Suwon-si (KR)

(72) Inventors: Injoon Hong, Plano, TX (US); Sourabh Ravindran, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 15/909,843

(22) Filed: Mar. 1, 2018

(65) Prior Publication Data

US 2019/0272028 A1    Sep. 5, 2019

(51) Int. Cl.
| G06F 3/01 | (2006.01) |
| H04N 5/247 | (2006.01) |
| G06T 7/70 | (2017.01) |
| G02B 27/01 | (2006.01) |

(52) U.S. Cl.
CPC ............... G06F 3/013 (2013.01); G06T 7/70 (2017.01); H04N 5/247 (2013.01); *G02B 27/017* (2013.01)

(58) Field of Classification Search
CPC .......... G06F 3/013; H04N 13/383; G06T 7/70
See application file for complete search history.

(56) References Cited

U.S. PATENT DOCUMENTS

| 5,737,012 A * | 4/1998 | Tabata .................. G02B 27/017 348/53 |
| 9,643,314 B2 | 5/2017 | Guerin et al. |
| 2011/0075257 A1 | 3/2011 | Hua et al. |
| 2013/0107214 A1 * | 5/2013 | Blixt ...................... A61B 3/113 351/210 |
| 2013/0131985 A1 | 5/2013 | Weiland et al. |
| 2013/0215112 A1 | 8/2013 | Ho et al. |
| 2013/0222548 A1 | 8/2013 | Yang et al. |
| 2013/0300637 A1 | 11/2013 | Smits et al. |
| 2014/0111632 A1 * | 4/2014 | Huang ............... G06K 9/00604 348/78 |
| 2014/0232638 A1 * | 8/2014 | Choi ...................... G06F 3/013 345/156 |

(Continued)

FOREIGN PATENT DOCUMENTS

| WO | 2010/118292 A1 | 10/2010 |
| WO | 2015/184412 A1 | 12/2015 |

OTHER PUBLICATIONS

Konrad et al., "Depth Cues in VR Head Mounted Displays With Focus Tunable Lenses", Standford University, 2015, 6 pages.

(Continued)

*Primary Examiner* — Robert J Hance

(57) ABSTRACT

A method, an electronic device and a non-transitory computer readable medium for are provided. The method includes capturing a first eye and a second eye. The method also includes identifying a first position of the first eye and a second position the second eye. Additionally, the method includes staggering the capture of the first eye and the second eye, wherein the first eye is captured prior to capturing the second eye. The method also includes identifying the first gaze direction with respect to a display. The method further includes mapping the second gaze direction of the second eye based on the identified first gaze direction, prior to capturing the second eye.

26 Claims, 11 Drawing Sheets

(56) References Cited

U.S. PATENT DOCUMENTS

| | | | |
|---|---|---|---|
| 2015/0039590 A1 | 2/2015 | Kim et al. | |
| 2015/0062322 A1 | 3/2015 | Gustafsson et al. | |
| 2015/0070273 A1* | 3/2015 | He | G06F 3/013 345/156 |
| 2015/0187115 A1* | 7/2015 | MacDonald | G06F 3/013 345/419 |
| 2015/0249818 A1 | 9/2015 | Murao et al. | |
| 2015/0288944 A1* | 10/2015 | Nistico | G02B 27/0172 345/156 |
| 2016/0033771 A1 | 2/2016 | Tremblay et al. | |
| 2016/0147067 A1 | 5/2016 | Hua et al. | |
| 2016/0170486 A1* | 6/2016 | Rydberg | G06K 9/00604 348/78 |
| 2016/0223986 A1 | 8/2016 | Archambeau et al. | |
| 2016/0225153 A1* | 8/2016 | Kim | G06K 9/00604 |
| 2016/0257000 A1 | 9/2016 | Guerin et al. | |
| 2016/0313556 A1 | 10/2016 | Futterer | |
| 2016/0357016 A1 | 12/2016 | Cakmakci et al. | |
| 2016/0377871 A1 | 12/2016 | Kress et al. | |
| 2017/0102767 A1* | 4/2017 | Kim | G06F 3/013 |
| 2017/0116459 A1 | 4/2017 | Chen et al. | |
| 2017/0123204 A1 | 5/2017 | Sung et al. | |
| 2017/0261610 A1* | 9/2017 | Scally | G01S 15/42 |
| 2017/0285337 A1* | 10/2017 | Wilson | A61B 3/113 |
| 2018/0027176 A1 | 1/2018 | Agell et al. | |
| 2018/0120933 A1* | 5/2018 | Waldorf | A61B 5/4845 |
| 2018/0249150 A1* | 8/2018 | Takeda | H04N 13/332 |
| 2019/0019508 A1* | 1/2019 | Rochford | G10L 15/22 |

OTHER PUBLICATIONS

Kramida et al., "Resolving the Vergence-Accommodation Conflict in Head Mounted Display", Department of Computer Science, University of Maryland, Aug. 2015, 17 pages.

Rolland et al., "Head Mounted Display Systems", Encyclopedia of Optical Engineering, 2005, 14 pages.

Stengel et al., "An Affordable Solution for Binocular Eye Tracking and Calibration in Head-Mounted Display", Proceedings of the 23rd ACM International Conference on Multimedia, Oct. 2015, 10 pages.

International Search Report dated May 8, 2019 in connection with International Patent Application No. PCT/KR2019/001388, 9 pages.

Written Opinion of the International Searching Authority dated May 8, 2019 in connection with International Patent Application No. PCT/KR2019/001388, 7 pages.

* cited by examiner

HIGH-SPEED STAGGERED BINOCULAR EYE TRACKING SYSTEMS

TECHNICAL FIELD

This disclosure relates generally to a user input. More specifically, this disclosure relates to staggered eye tracking on a head mounted display.

BACKGROUND

Virtual reality and augmented reality experiences are becoming prominent. For example, 360° video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene they desire. Display and navigation sensors track head movement in real-time to determine the region of the 360° video that the user wants to view.

Methods for interacting with and controlling computing devices are continually improving in order to conform more natural approaches. Computing devices, such as personal computers, smart phones, tablets, head mounted displays and the like, utilize graphical user interfaces (GUI) on a display screen to facility control by a user. Objects such as text, images, and video are displayed on a screen and the user can employ various instruments to control the computing device such as, a keyboard, a mouse, a touchpad. Many such methods for interacting with and controlling a computing device generally require a user to physically touch the screen or utilizing an instrument such as a keyboard or mouse to provide a quick and precise input. The advent of head mounted displays coupled with the prominence of virtual reality and augmented reality will require new approaches to interact with computing devices.

SUMMARY

This disclosure provides a high-speed staggered binocular eye tracking system.

In a first embodiment, a method for eye tracking is provided. The method includes capturing a first eye and a second eye. The method also includes identifying a first position of the first eye and a second position the second eye. The method further includes staggering the capture of the first eye and the second eye, wherein the first eye is captured prior to capturing the second eye. The method also includes identifying the first gaze direction with respect to a display based on the identified first position of the first eye. The method also includes mapping the second gaze direction of the second eye based on the identified first gaze direction, prior to capturing the second eye.

In a second embodiment, an electronic device is provided. The electronic device includes at least one camera configured to capture a first eye and a second eye. The electronic device includes a processor coupled to the at least one camera. The processor configured to identify a first position of the first eye and a second position the second eye. The processor is also configured to stagger the capture of the first eye and the second eye, wherein the first eye is captured prior to capturing the second eye. The processor is further configured to identify the first gaze direction with respect to a display based on the identified first position of the first eye. The processor is further configured to map the second gaze direction of the second eye based on the identified first gaze direction, prior to capturing the second eye.

In a third embodiment, a non-transitory computer readable medium embodying a computer program is provided. The computer program includes program code that when executed causes a processor to capture a first eye and a second eye; identify a first position of the first eye and a second position the second eye; stagger the capture of the first eye and the second eye, wherein the first eye is captured prior to capturing the second eye; identify the first gaze direction with respect to a display based on the identified first position of the first eye; and map the second gaze direction of the second eye based on the identified first gaze direction, prior to capturing the second eye.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
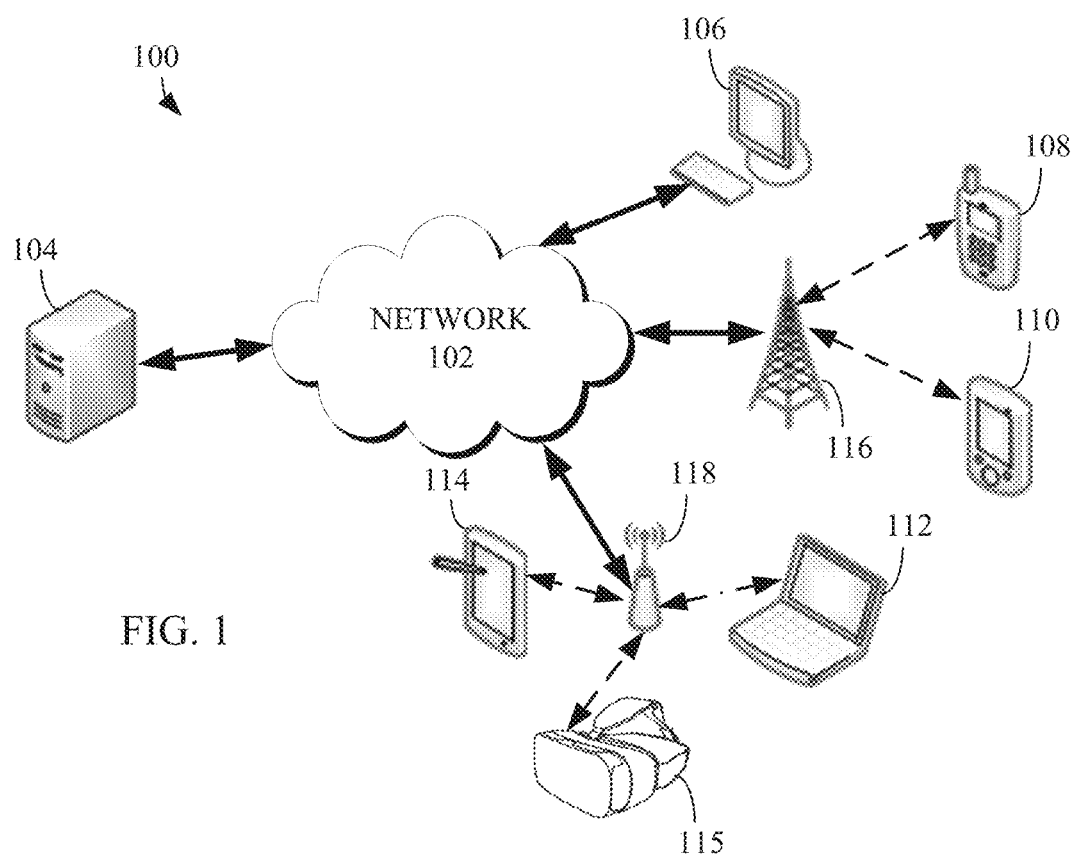
FIG. 1 illustrates an example communication system in accordance with embodiments of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Virtual reality (VR) is a rendered version of a visual and audio scene on a display or a headset. The rendering is designed to mimic the visual and audio sensory stimuli of the real world as naturally as possible to an observer or user as they move within the limits defined by the application. For example, VR places a user into immersive worlds that interact with their head movements. At the video level, VR is achieved by providing a video experience that covers as much of the field of view (FOV) as possible together with the synchronization of the viewing angle of the rendered video with the head movements. Although multiple types of devices are able to provide such an experience, head mounted displays are the most popular. Typically head mounted displays rely either on dedicated screens integrated into the device and running with external computers, a smartphone inserted into a head mounted display via brackets or a head mounted display that is integrated with a computer itself. The first approach utilizes lightweight screens and benefits from a high computing capacity. In contrast the smartphone-based systems, utilizes a higher mobility and can be less expensive to produce. In both instances, the video experience is generated the same.

VR content can be represented in different formats, such as panoramas or spheres, depending on the capabilities of the capture systems. For example, the content can be captured from real life or computer generated or a combination thereof. Events captured to video from the real world often require multiple (two or more) cameras to record the surrounding environment. While this kind of VR can be rigged by multiple individuals using numerous like cameras, two cameras per view are necessary to create depth. In another example, content can be generated by a computer such as computer generated images (CGI). In another example, combination of real world content with CGI is known as augmented reality.

Many systems capture spherical videos covering a 360°× 180° view a 360°×360°, and the like. A 360°×180° view is represented as a view of a half sphere. For example, a 360°×180° view is a rendered view of a top half of a sphere where the viewer can view 360° in the horizontal plane and 180° vertical view plane. A 360°×360° view is represented as a complete spherical rendering, covering a full sphere. For example, a 360°×360° view can be generated by stitching two 360°×180° views together to yield a single video or image covering an entire 360° view. Capturing content within a 360°×180° view is typically performed by multiple cameras. Various camera configurations can be used for recording two-dimensional and three-dimensional content. The captured views from each camera are stitched together to combine the individual views of the omnidirectional camera systems to a single panorama or sphere. The stitching process typically avoids parallax errors and visible transitions between each of the single views.

As used herein VR content and VR video includes omnidirectional 360° media scene (namely, a 360°×360° view). VR content also includes augmented reality, mixed reality and other computer augmented reality mediums that are presented to a user on a display. In certain embodiments, the display is a head mounted display. VR content places the viewer in an immersive environment that allows a user to interact and view different regions of the environment based on their head movements, as discussed above.

According to embodiments of the present disclosure, various methods for controlling and interacting with a computing device are provided. Graphical user interfaces allow a user interact with a computing device by enabling a user to locate and select objects on a screen. Common interactions include physical manipulations, such as, a user can physically move a mouse, type on a keyboard, touch a touch screen, to name a few. There are instances in which utilizing various physical interaction, such as touching a touchscreen, are not feasible, such as when a user wears a head mounted display. For example, when the display screen is inside an enclosure and resting on the user's face near the user's eyes, the user is unable to touch the screen. Additionally, there are instances in which utilizing an accessory device, such as a keyboard, mouse, touch pad, or remote, are cumbersome as the user is unable to see the device, or desires not to hold a remote. For example, a head mounted display can occlude the user's sight of the accessories preventing the user from accurately providing inputs to the electronic device. Similarly, if the user is watching a movie on a head mounted display, there are instances when a user desires to not hold a remote for the duration of the movie.

Embodiments of the present disclosure provide additional approaches to interact with an electronic device.

Embodiments of the present disclosure utilize eye tracking, to provide a quicker and more accurate user input. Specifically, embodiments of the present disclosure stagger the eye tracking. Eye tracking involves tracking the eye focus (or gaze) of a user when the user views a display. The eye tracking can identify areas on the display of interest to the user. For example, when a user focuses on a specific area of the screen, such as a menu icon, the electronic device can open the menu without requiring the user to manually select the menu icon.

Eye tracking refers to the process of detecting the direction of a user's gaze, based on the angular orientation of the eye in 3-dimensional (3-D) space. In certain embodiments, eye tracking includes the detection of (i) the location of the eye, (ii) the torsion of the eye, (iii) the shape of the eye, (iv) the current focal distance of the eye, (v) dilation of the pupil, (vi) as well as additional features of the state an eye(s) of the user. The location of the eye, for example, is the center of the eye. The torsion of the eye, for example, is the roll of the eye about the pupillary axis. Various techniques for eye tracking, captures video images of a user and identifies an orientation of the pupils of the user. For example, a single camera can be used to capture a single eye of the user to derive the gaze direction. In another example, two or more cameras can be used to capture both eyes of the user independently and derive the gaze of the user. When a camera captures each eye of the user (such that a first camera captures the right eye and a second camera captures the left eye), a focal distance can be derived in order to determine the distance an object is from the user, that the user is focuses on. Various types of cameras are utilized such as general light cameras, infrared cameras, radar, and the like.

FIG. 1 illustrates an example computing system 100 according to this disclosure. The embodiment of the system 100 shown in FIG. 1 is for illustration only. Other embodiments of the system 100 can be used without departing from the scope of this disclosure.

The system 100 includes network 102 that facilitates communication between various components in the system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between a server 104 and various client devices 106-115. The client devices 106-115 may be, for example, a smartphone, a tablet computer, a laptop, a personal computer, a wearable device, or a head-mounted display (HMD). The server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-115 represents any suitable computing or processing device that interacts with at least one server or other computing device(s) over the network 102. In this example, the client devices 106-115 include a desktop computer 106, a mobile telephone or mobile device 108 (such as a smartphone), a personal digital assistant (PDA) 110, a laptop computer 112, a tablet computer 114, and a HMD 115. However, any other or additional client devices could be used in the system 100. HMD 115 can be a standalone device or include a bracket system that can hold another client device such as mobile device 108. A smartphones represent a class of mobile devices 108 that are a handheld device with a mobile operating system and an integrated mobile broadband cellular network connection for voice, short message service (SMS), and internet data communication. As described in more detail below the HMD 115 can display VR content to one or more users, and include eye tracking capabilities.

In this example, some client devices 108-115 communicate indirectly with the network 102. For example, the client devices 108 and 110 (mobile devices 108 and PDA 110, respectively) communicate via one or more base stations 116, such as cellular base stations or eNodeBs (eNBs). Also, the client devices 112, 114, and 115 (laptop computer 112, tablet computer 114 and HMD 115, respectively) communicate via one or more wireless access points 118, such as IEEE 802.11 wireless access points. Note that these are for illustration only and that each client device 106-115 could communicate directly with the network 102 or indirectly with the network 102 via any suitable intermediate device(s) or network(s).

In certain embodiments, the mobile device 108 (or any other client device 106-115) transmits information securely and efficiently to another device, such as, for example, the server 104. The mobile device 108 (or any other client device 106-115) can function as a VR display when attached to a headset and can function similar to HMD 115. The mobile device 108 (or any other client device 106-115) can trigger the information transmission between itself and server 104.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for a client device 106-115 or the server 104 to track the eyes of a user while the user is viewing a display. In certain embodiments, client devices 106-115 display VR content while the client devices 106-115 or the server 104 derive the gaze direction of the user. In certain embodiments, client devices 106-115 or the server 104 capture one eye then the other eye of the user in a repetitive manner, rather than capturing both eyes at simultaneously or nearly simultaneously. By capturing one eye then the other eye of a user repetitively simulates a monocular eye tracking system rather than a binocular eye tracking system. A monocular eye tracking system captures only one eye of the user to derive the eye focus of the user, whereas a binocular eye tracking system captures both eyes of the user simultaneously. During a binocular eye tracking the camera image sensor captures both eyes at a similar time and the captured data is transmitted via a communication interface to the processor for processing.

Figure 2:
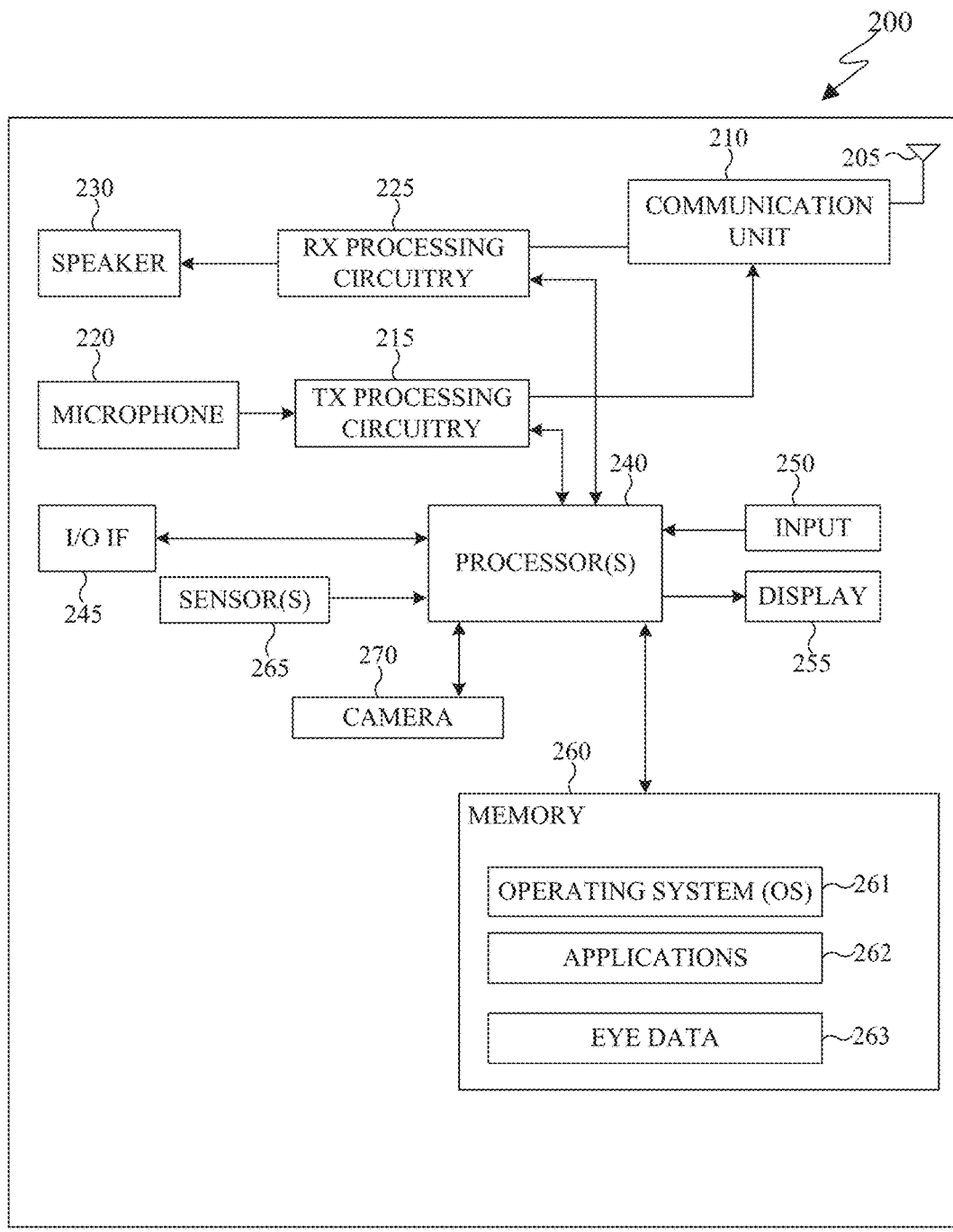
FIG. 2 illustrates an example electronic device in accordance with an embodiment of the present disclosure.

FIG. 2 illustrates an electronic device, in accordance with an embodiment of this disclosure. The embodiment of the electronic device 200 shown in FIG. 2 is for illustration only and other embodiments can be used without departing from the scope of this disclosure. The electronic device 200 can come in a wide variety of configurations, and FIG. 2 does not limit the scope of this disclosure to any particular implementation of an electronic device. In certain embodiments, one or more of the client devices 104-115 of FIG. 1 can include the same or similar configuration as electronic device 200.

In certain embodiments, the electronic device 200 is an eye tracking device used to track the direction of a gaze as well as a location of the eye focus on a display. In certain embodiments, the electronic device 200 is a computer (similar to the desktop computer 106 of FIG. 1), mobile device (similar to mobile device 108 of FIG. 1), a PDA (similar to the PDA 110 of FIG. 1) a laptop (similar to laptop computer 112 of FIG. 1), a tablet (similar to the tablet computer 114 of FIG. 1), a HMD (similar to the HMD 115 of FIG. 1), and the like. In certain embodiments, electronic device 200 captures and tracks the eye movements of a user, such as identifying a position of each eye as well as identifying a gaze direction of each eye and deriving a focus position on the display or real world object. Electronic device 200 can represent one or more tracking systems or one or more image processing devices discussed in more detail below with respect to FIG. 3.

As shown in FIG. 2, the electronic device 200 includes an antenna 205, a communication unit 210, transmit (TX) processing circuitry 215, a microphone 220, and receive (RX) processing circuitry 225. In certain embodiments, the communication unit 210 is a general communication interface and can include, for example, a RF transceiver, a BLUETOOTH transceiver, or a WI-FI transceiver ZIGBEE, infrared, and the like. The electronic device 200 also includes a speaker 230, a processor 240, an input/output (I/O) interface 245, an input 250, a display 255, a memory 260, sensor(s) 265, and camera 270. The memory 260 includes an operating system (OS) 261, one or more applications 262, and eye data 263. The memory 260 can include voice recognition dictionary containing learned words and commands.

The communication unit 210 receives, from the antenna 205, an incoming RF signal such as a BLUETOOTH or WI-FI signal from an access point (such as a base station, WI-FI router, BLUETOOTH device) of the network 102 (such as Wi-Fi, BLUETOOTH, cellular, 5G, LTE, LTE-A, WiMAX, or any other type of wireless network). The communication unit 210 down-converts the incoming RF signal to generate an intermediate frequency or baseband signal. The intermediate frequency or baseband signal is sent to the RX processing circuitry 225 that generates a processed baseband signal by filtering, decoding, or digitizing, or a combination thereof, the baseband or intermediate frequency signal. The RX processing circuitry 225 transmits the processed baseband signal to the speaker 230, such as for voice data, or to the processor 240 for further processing, such as for web browsing data or image processing, or both.

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, digitizes, or a combination thereof, the outgoing baseband data to generate a processed baseband or intermediate frequency signal. The communication unit 210 receives the outgoing processed baseband or intermediate frequency signal from the TX processing circuitry 215 and up-converts the baseband or intermediate frequency signal to an RF signal that is transmitted via the antenna 205.

The processor 240 can include one or more processors or other processing devices and execute the OS 261 stored in the memory 260 in order to control the overall operation of the electronic device 200. For example, the processor 240 can control the reception of forward channel signals and the transmission of reverse channel signals by the communication unit 210, the RX processing circuitry 225, and the TX processing circuitry 215 in accordance with well-known principles. The processor 240 is also capable of executing other applications 262 resident in the memory 260, such as, one or more applications for image processing or eye tracking or both. The processor 240 can include any suitable number(s) and type(s) of processors or other devices in any suitable arrangement. For example, the processor 240 is capable of natural language processing, voice recognition processing, object recognition processing, eye tracking processing, and the like. In some embodiments, the processor 240 includes at least one microprocessor or microcontroller. Example types of processor 240 include microprocessors, microcontrollers, digital signal processors, field programmable gate arrays, application specific integrated circuits, and discreet circuitry.

The processor 240 is also capable of executing other processes and programs resident in the memory 260, such as operations that receive, store, and timely instruct by providing voice and image capturing and processing. The processor 240 can move data into or out of the memory 260 as required by an executing process. In some embodiments, the processor 240 is configured to execute a plurality of applications 262 based on the OS 261 or in response to signals received from eNBs or an operator.

The processor 240 is also coupled to the I/O interface 245 that provides the electronic device 200 with the ability to connect to other devices such as the client devices 106-115. The I/O interface 245 is the communication path between these accessories and the processor 240

The processor 240 is also coupled to the input 250 and the display 255. The operator of the electronic device 200 can use the input 250 to enter data or inputs, or a combination thereof, into the electronic device 200. Input 250 can be a keyboard, touch screen, mouse, track ball or other device capable of acting as a user interface to allow a user in interact with electronic device 200. For example, the input 250 can include a touch panel, a (digital) pen sensor, a key, or an ultrasonic input device. The touch panel can recognize, for example, a touch input in at least one scheme along with a capacitive scheme, a pressure sensitive scheme, an infrared scheme, or an ultrasonic scheme. In the capacitive scheme, the input 250 is able to recognize a touch or proximity. Input 250 can be associated with sensor(s) 265, a camera 270, or a microphone, such as or similar to microphone 220, by providing additional input to processor 240. In certain embodiments, sensor 265 includes inertial sensors (such as, accelerometers, gyroscope, and magnetometer), optical sensors, motion sensors, cameras, pressure sensors, heart rate sensors, altimeter, breath sensors (such as microphone 220), and the like. Input 250 can be associated with the camera 270. Input 250 can include one or more cameras 270 for eye tracking. The input 250 also can include a control circuit.

The display 255 can be a liquid crystal display, light-emitting diode (LED) display, organic LED (OLED), active matrix OLED (AMOLED), or other display capable of rendering text and graphics, such as from websites, videos, games and images, and the like. Display 255 can be sized to fit within a HMD. Display 255 can be a singular display screen or multiple display screens for stereoscopic display. In certain embodiments, display 255 is a heads up display (HUD).

The memory 260 is coupled to the processor 240. Part of the memory 260 can include a random access memory (RAM), and another part of the memory 260 can include a Flash memory or other read-only memory (ROM).

The memory 260 can include persistent storage (not shown) that represents any structure(s) capable of storing and facilitating retrieval of information (such as data, program code, or other suitable information on a temporary or permanent basis). The memory 260 can contain one or more components or devices supporting longer-term storage of data, such as a ready only memory, hard drive, Flash memory, or optical disc. The memory 260 also can contain eye data 263. Eye data 263 includes a mapping of the user eye as well as calibration information associated with determining a focus location and estimating a gaze direction of an eye of the user.

Electronic device 200 further includes one or more sensor(s) 265 that are able to meter a physical quantity or detect an activation state of the electronic device 200 and convert metered or detected information into an electrical signal. In certain embodiments, sensor 265 includes inertial sensors (such as accelerometers, gyroscopes, and magnetometers), optical sensors, motion sensors, cameras, pressure sensors, heart rate sensors, altimeter, breath sensors (such as microphone 220), and the like. For example, sensor(s) 265 can include one or more buttons for touch input (such as on the headset or the electronic device 200), a camera, a gesture sensor, a gyroscope or gyro sensor, an air pressure sensor, a magnetic sensor or magnetometer, an acceleration sensor or accelerometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an Infrared (IR) sensor, an ultrasound sensor, an iris sensor, a fingerprint sensor, and the like. The sensor(s) 265 can further include a control circuit for controlling at least one of the sensors included therein. The sensor(s) 265 can be used to determine an orientation and facing direction, as well as geographic location of the electronic device 200. Any of these sensor(s) 265 can be disposed within the electronic device 200, within a headset configured to hold the electronic device 200, or in both the headset and electronic device 200, such as in embodiments where the electronic device 200 includes a headset.

Camera 270 captures an eye of the user. Camera 270 monitors, tracks, and measures the location an eye, to identify where the eye is looking. Eye information captured about the eye of the user allows the processor 240 can identify a location of the eye, identify a gaze direction of the eye as well as derive the eye focus location of the eye. In certain embodiments, camera 270 is a pair (or multiple pairs) of cameras each capturing a respective eye of the user. For example, camera 270 focuses on one or both eyes and records movements of each eye as the viewer looks at some kind of stimulus, such as a GUI. In certain embodiments, camera 270 utilizes a light camera (such as a RGB camera) an infrared or near-infrared light source, such as non-collimated light can detect light reflecting off the cornea or another portion of the eye. Based on the information captured by camera 270, the processor 240 can then derive a vector between the center of the pupil, the light source, and the reflection of light. The vector can then indicate a location at which the user is looking. Eye tracking techniques can include a source light positioned either coaxial with the optical path of the eye, or the light source is offset, among others. In certain embodiments, camera 270 also includes a camera positioned to capture what the user is viewing. A camera that is positioned to capture what the user is viewing is represented as a world camera, as the camera views the world the user is viewing. The world camera is also a display camera as the camera captures the display that the user is viewing.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more an eye tracking processors, and the like. Also, while FIG. 2 illustrates the electronic device 200 configured as a mobile telephone, tablet, smartphone, or HMD, the electronic device 200 can be configured to operate as other types of mobile or stationary devices.

Figure 3:
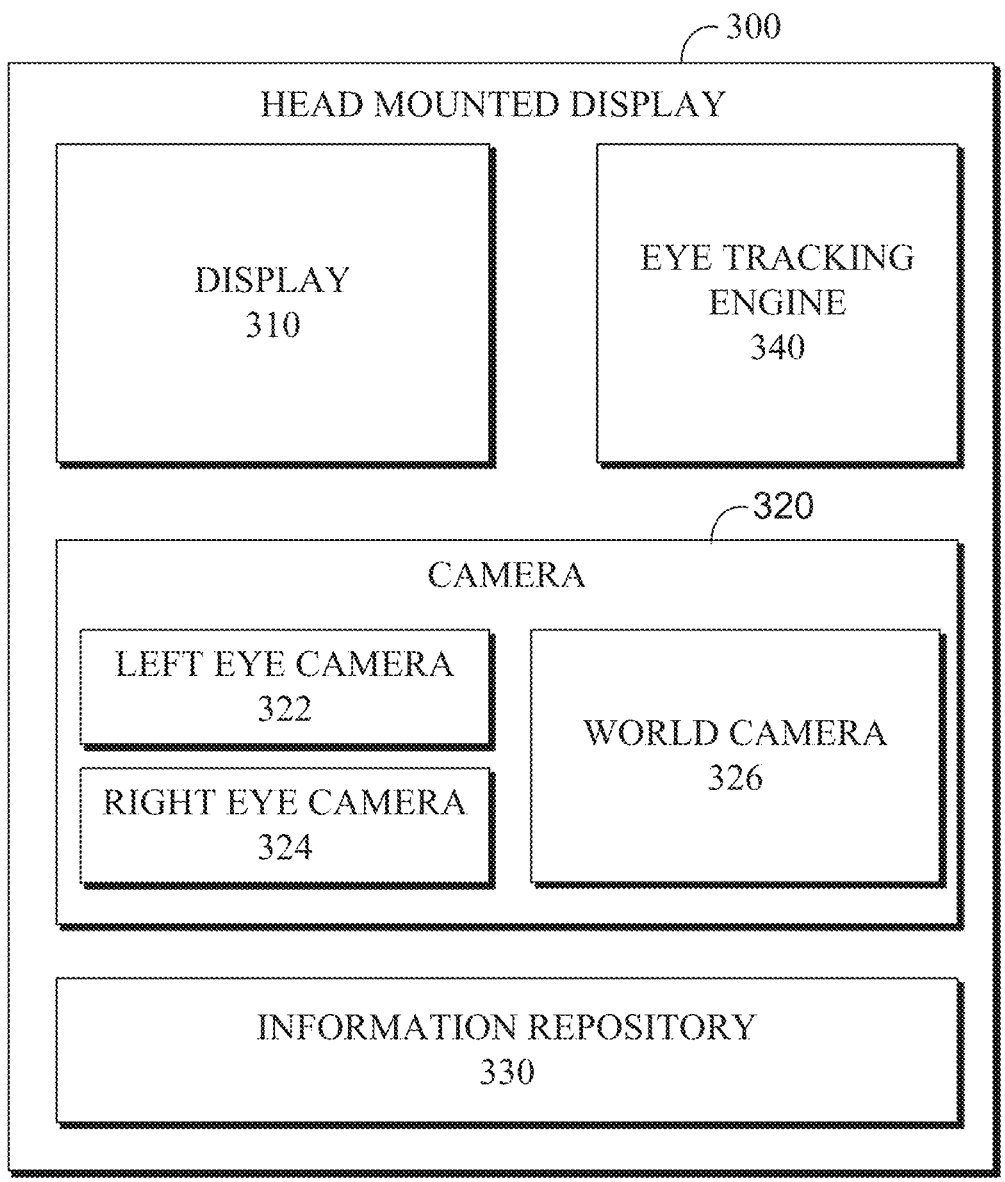
FIG. 3 illustrates an example block diagram of a head mounted display in accordance with embodiments of the present disclosure.

FIG. 3 illustrates a block diagram of head mounted display (HMD) 300, in accordance with an embodiment of this disclosure. FIG. 3 illustrates a high-level architecture, in accordance with an embodiment of this disclosure. The embodiment of the HMD 300 shown in FIG. 3 is for illustration only. Other embodiments can be used without departing from the scope of the present disclosure. HMD 300 can be configured similar to any of the one or more client devices 106-115 of FIG. 1, and can include internal components similar to that of electronic device 200 of FIG. 2. For example, HMD 300 can be similar to the HMD 115 of FIG. 1, as well as a desktop computer (similar to the desktop computer 106 of FIG. 1), a mobile device (similar to the mobile device 108 and the PDA 110 of FIG. 1), a laptop computer (similar to the laptop computer 112 of FIG. 1), a tablet computer (similar to the tablet computer 114 of FIG. 1), and the like.

Head mounted display 310 is an electronic device that can display content, such as text, images and video, through a GUI, such as display 310. In certain embodiments, the head mounted display 300 is worn on the head of a user or part of a helmet similar to HMD 115 of FIG. 1. HMD 300 can display both virtual reality (VR), augmented reality (AR), or mixed reality (MR) or a combination thereof. HMD 300 includes display 310, camera 320, information repository 330, and eye tracking engine 340. HMD 300 also can include speakers, haptic feedback, and other feedback techniques.

Display 310 is similar to display 255 of FIG. 2. In certain embodiments, display 310 is a standalone display affixed to HMD 300 via brackets. For example, display 310 is similar to a display screen on mobile device, or a display screen on a computer or tablet. In certain embodiments, display 310 includes two displays, for a stereoscopic display providing a single display for each eye of a user. In certain embodiments, display 312 is a transparent display, such as see through glasses, allowing the user to see through the head mounted display 300. HMD 300 can completely replace the FOV of a user with the display 310 depicting a simulated visual component. The display 310 and can render, display or project VR, augmented reality, and the like.

Camera 320 includes multiple cameras such as left eye camera 322, right eye camera 324, and world camera 326. Each camera 320 is able to view an environment and convert the information into digital form. That is, each camera of camera 320 is capable of generating a sequence of images and transmitting the images to eye tracking engine 340. Camera 320 represents an array of cameras that are able to sense a position, or movement, or both, within each cameras viewing radius. Camera 320 can include any number of devices that can capture or generate an image.

Left eye camera 322 and right eye camera 324 can include one or more of a color camera, a video camera, a depth camera, a motion sensor, radar, sonar, infrared (IR), and the like. Left eye camera 322 is positioned to capture the left eye of a user. Right eye camera 324 is positioned to capture the right eye of a user. Based on the captured data of each eye of the user, the eye tracking engine 340 identifies the location of each eye, identify the gaze direction of each eye as well as an eye focus location of each eye. In certain embodiments, the left eye camera 322 represents multiple cameras directed towards the left eye of a user. Similarly, in certain embodiments, the right eye camera 324 represents multiple cameras directed towards the right eye of a user.

World camera 326 can include a color camera, a video camera, a depth camera, a motion sensor, and the like. World camera 326 is a camera positioned to capture what the user is viewing. Based on the captured data of the world camera 326, coupled with the identified gaze direction of the user, the eye tracking engine 340 determines exactly on where the display the user is viewing. Additionally, based on the captured data of the world camera 326, coupled with the identified gaze direction of the user, the eye tracking engine 340 derives the focal distance of the user. The focal distance is a distance from the user's eye to the object on which the user is focused.

Information repository 330 can be similar to memory 260 of FIG. 2. In certain embodiments, information repository 330 is similar to eye data 263 of FIG. 2. Information repository 330 can store data gathered by sensors 265 of FIG. 2, camera 320 (such as left eye camera 322, right eye camera 324, and world camera 326), as well as various calibrations of the mapping process of the eye tracking engine 340. Data stored in information repository 330 includes various geographical locations, captured video and pictures from each camera 320. In certain embodiments, information repository 330 maintains a log of the recently focused areas on the display 310. Information repository 330 can maintain eye focus coordinates based on time of by timestamp. Information repository 330 can maintain a calibration function associated with each user of HMD 300.

Eye tracking engine 340 tracks each eye of the user and identifies positions of each eye. In certain embodiments, eye tracking engine 340 captures and tracks each eye simultaneously or nearly simultaneously via the left eye camera 322 and the right eye camera 324. In certain embodiments, eye tracking engine 340 staggers the left eye camera 322 and the right eye camera 324 so each camera captures the respective eye at different time intervals. That is, while the left eye camera 322 is running and capturing an image of the left eye, the right eye camera 324 starts to run. That is, the left eye camera 322 and the right eye camera 324 start and stop each captured image of an eye at different time intervals. By staggering the capture process, eye tracking engine 340 can process and track the eyes faster than capturing each eye simultaneously or nearly simultaneously.

When the capturing process is staggered, the eye tracking engine 340 can identify the position of each eye independently. For example, the identified position of the first eye indicates a first gaze direction of the first eye with respect to a display. Similarly, the identified position of the second eye indicates a second gaze direction of the second eye with respect to a display.

In certain embodiments, eye tracking engine 340 estimates the focus distance. The focus distance is defined as the distance of from the focal point (i.e., object) of the eye focus from the user to the eye of the user. That is when the user is viewing an object with depth, the further the object is from the user, the further the eye focus is from the user. For example, if the user is viewing an image or an actual scene with foreground and background, the eye focus of the user is identified based on the intersection of gaze direction of the left eye with the gaze direction of the right eye. Each eye of a user can view up down, left and right (an X-Y coordinate system). When the left eye and the right eye view the same object, an element of depth is perceived based on the distance the object is from the user.

According to certain embodiments of this disclosure, eye tracking engine 340 estimates the focus distance of the user even when the left eye camera 322 and the right eye camera 324 are staggered. Initially, eye tracking engine 340 is calibrated for each user. That is, eye tracking engine 340 initially captures both the left eye and the right eye simultaneously or near simultaneously, via left eye camera 322 and right eye camera 324, respectively. While, the left eye camera 322 and right eye camera 324 capture the left and right eye of the user, respectively, the world camera 326 captures what the user is viewing. The eye tracking engine 340 fixes each eye camera (left eye camera 322 and right eye camera 324) with respect to the world camera 326. That is, a six degrees of freedom relationship is created between the each eye camera (left eye camera 322 and right eye camera 324) with respect to the world camera 326. Based on the relationship between the world camera 326 and each eye camera (left eye camera 322 and right eye camera 324), a mapping is derived between the gaze direction of each eye with respect to the world camera, when left eye camera 322 and right eye camera 324 are staggered. For example, when the eye cameras (left eye camera 322 and right eye camera 324) are staggered, the eye tracking engine 340 identifies the gaze direction of the left eye via the left eye camera 322, the gaze direction of the right eye can be mapped, without the need for the right eye camera 324 to capture the right eye. Similarly, the eye tracking engine 340 identifies the gaze direction of the right eye via the right eye camera 324, the gaze direction of the left eye can be mapped, without the need for the left eye camera 322 to capture the left eye.

In certain embodiments, the mapping of the left eye, right eye and world camera, is based on a coordinate system of the world camera. The coordinate system of the world camera is based on the viewing direction of the user, and not the coordinate system of the eye camera that is positioned towards the user. Stated differently, the coordinate system of the world camera is based on the viewing direction away from the user. In this embodiment, the mapping to the world camera coordinate system is independent and unaffected by the number of eye cameras. For example, left eye camera 322 can represent the or more cameras positioned to capture the left eye of the user and the right eye camera 324 can represent the or more cameras positioned to capture the right eye of the user.

Upon completion of the calibration process, the left eye camera 322 and right eye camera 324 are staggered. When the left eye camera 322 captures the left eye, the eye tracking engine 340 can identify the gaze direction of the left eye. Based on the mapping, the eye tracking engine 340 estimates the gaze direction of the right eye. The eye tracking engine 340 then derives focal distance as the intersection point of the left eye gaze and the right eye gaze. The focal distance is the distance from the user's eyes to the focus point, such as the intersection point of both eyes on which the user is focusing. Then the right eye camera 324 captures the right eye. The eye tracking engine 340 can identify the gaze direction of the right eye. Based on the mapping, the eye tracking engine 340 estimates the gaze direction of the left eye. The eye tracking engine 340 then derives the focal distance as the intersection point of the right eye gaze and the left eye gaze.

In certain embodiments, the eye tracking engine 340 uses a previous eye position when mapping the focal position of the other eye. For example, the left eye camera 322 captures the left eye then the right eye camera 324 captures the right eye. The eye tracking engine 340 can derive the focal distance by using an identified gaze position of the right eye and an identified position of the left eye. The focal distance is derived as the intersection of the gaze direction of the right eye with the gaze direction of the left eye.

In certain embodiments, the calibration process occurs for each person who uses the HMD 300. For example, eye tracking engine 340 can adjust the relationship between the eye cameras (left eye camera 322 and right eye camera 324) and the world camera 326 via a transformation matrix. The transformation matrix is based on the relationship between the world camera 326 and each eye camera (left eye camera 322 and right eye camera 324). The transformation matrix, is used to adjust various three-dimensional positions and the six degrees of freedom relationship between each camera.

In certain embodiments, display 310 is a multi-focal plane display. A multi-focal plane display is a display with multiple layers that can activate and deactivated to add elements of depth to the overall content. A multi-focal plane display requires a very quick response in order to reduce the appearance of flickering between each display when viewed by a user. By staggering the left eye camera 322 and the right eye camera 324, and mapping the focal distance, increases eye tracking response time. By deriving the focal distance, specific display plans of the multi-focal plane display can be activated and deactivated quicker.

In certain embodiments, display 310 is rendered with different resolutions dependent on the gaze position of the user, similar to a foveated rendering. Foveated rendering alters the rendering resolution on the display 310, based on the derived eye gaze direction. Foveated rendering is performed by actively tracking the eyes of the user and presenting an area of high resolution at the point of gaze, and lower resolution in the peripheral vision of the user. For example, using concentric circles, from the innermost circle to the outermost circle the resolution can be degraded. High resolution is rendered at the location on the display 310 of the users gaze, and each larger concentric circle, the resolution is lowered. The concentric circles move and adjust the resolution according to the gaze direction of the eyes of the user. In certain embodiments, the concentric circles are concentric areas of any shape.

In certain embodiments, the eye tracking engine 340 dynamically adjusts the speed of the eye tracking. For example, eye tracking engine 340 can instruct one eye camera to continually capture one eye and stagger the capture the other eye of the user. For instance, the left eye camera 322 continually captures the left eye while the right eye camera is staggered. In this embodiment, the eye tracking engine 340 can adjust the speed of the eye tracking based on the content that is on the display. For example, if the user is using eye tracking as a user interface, foveated rendering, or using a multi-focal plane display, the eye tracking engine 340 will stagger the eye cameras to increase the eye capture speed. In certain embodiments, eye tracking engine 340 can adjust the number of cameras that track each eye. For example, if the user is performing a task that can utilize a slower eye tracking capability, then the eye tracking engine 340 can dynamically shift from staggering both the left eye camera 322 and the right eye camera 324 to continually track one eye via one eye camera while staggering the other eye camera. In another example, the eye tracking engine 340 can dynamically adjust the number of cameras that are used depending on the application or service to reduce power consumption. Using fewer cameras should reduce power consumption. For instance, one application or program may utilize multiple cameras for tracking each eye, for faster eye tracking capabilities. In contrast, other applications or programs may utilize a single camera to track each eye.

In another example, the eye tracking engine 340 can adjust the eye tracking speeds for each eye independently, based on where on the display screen the user is viewing. For example, if the user is viewing content to the far right of the screen, the eye tracking engine 340 can stagger the eye capture of the right eye while the left eye camera 322 is not staggered. When the user views an object on the right, often they are right eye dominant at that moment based on the angle the user is viewing. Similarly, when the user views an object on the left, often they are left eye dominant at that moment. Therefore, eye tracking engine 340 can adjust the speed of the eye tracking based on determining a dominant eye at a particular point in time.

Figure 4A:
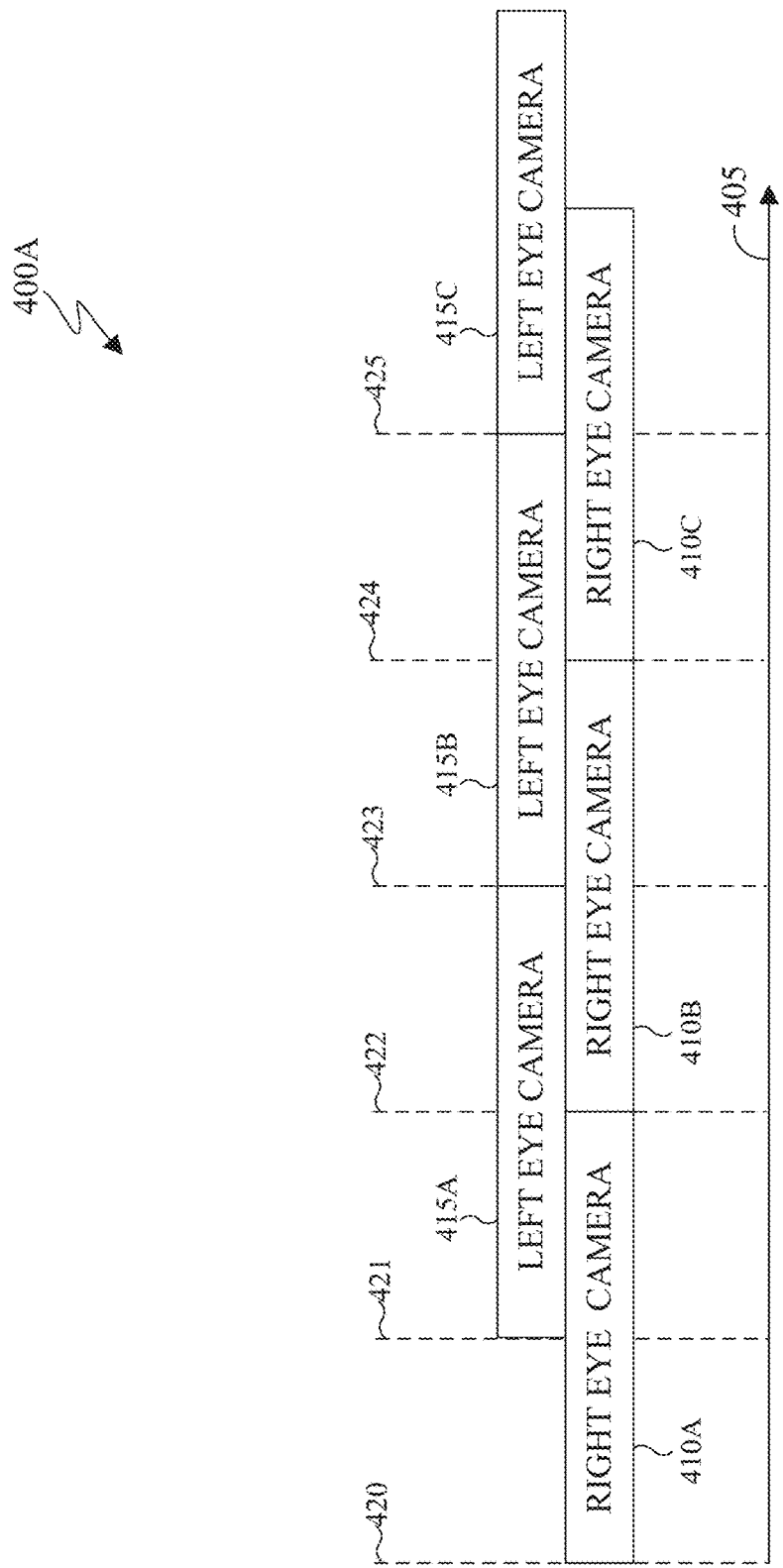
FIGS. 4A and 4B illustrate an example graphical representation of a staggering effect of two eye cameras in accordance with embodiments of the present disclosure.
Figure 4B:
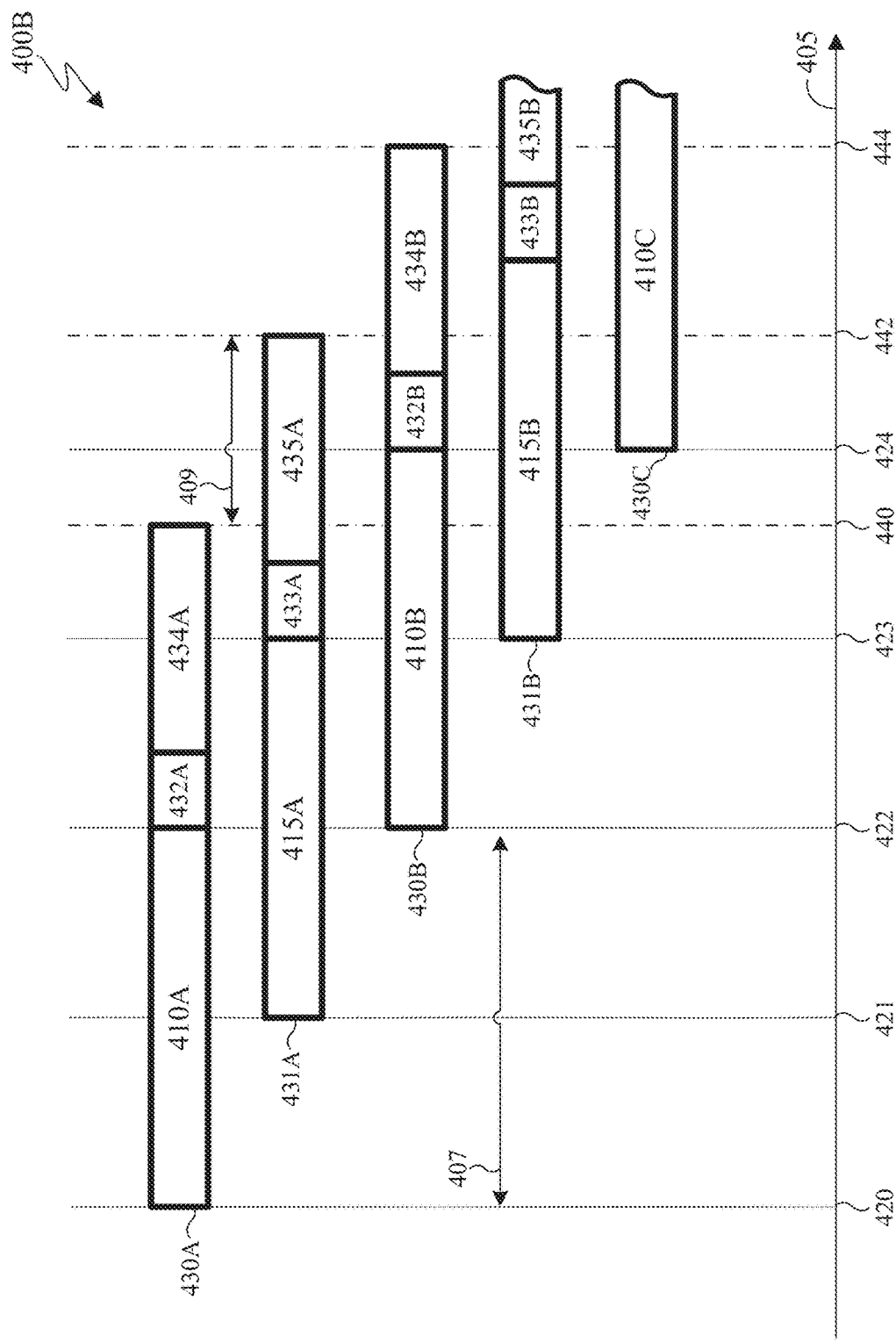

FIGS. 4A and 4B illustrate an example graphical representation of a staggering effect of two eye cameras in accordance with an embodiment of the present disclosure. FIG. 4A illustrates a graph 400A and FIG. 4B illustrates a graph 400B. FIGS. 4A and 4B depict the staggering of a right eye camera 410 and a left eye camera 415. Right eye camera 410 is similar to right eye camera 324 of FIG. 3. Left eye camera 415 is similar to left eye camera 322 of FIG. 3. Right eye camera 410A, 410B, and 410C represent a singular camera capturing sequential instances of the position of the right eye. Similarly, left eye camera 415A, 415B, and 415C represent a singular camera capturing sequential instances of the position of the left eye.

As depicted in FIG. 4A, time 405 increases starting from time 420. At time 420, right eye camera 410A commences to capture the position of the right eye. Midway through the capturing the right eye, left eye camera 415A is activated to capture the left eye at time 421. The right eye camera 410A concludes capturing at time 422.

At time 422, right eye camera 410B commences to capture the position of the right eye. Midway through the capturing the right eye at time 423 the left eye camera 415A concludes capturing the position of the left eye. Immediately thereafter, the left eye camera 415B then commences to capture the position of the left eye at time 423. The right eye camera 410B concludes capturing at time 424.

At time 424, right eye camera 410C commences to capture the position of the right eye. Midway through the capturing the right eye at time 425 the left eye camera 415B concludes capturing the position of the left eye. Immediately thereafter, the left eye camera 415C then commences to capture the position of the left eye at time 425. The right eye camera 410C concludes capturing thereafter.

When the right eye camera 410 and the left eye camera 415 are not staggered, each camera would start and stop at or near the same time. By each the cameras starting and stopping at or near the same time, identifying the position of the eye and subsequently the gaze direction and focal position are reduced by half.

FIG. 4B illustrates a detailed time lapsed view of FIG. 4A. FIG. 4B depicts the processing of the images captured by each camera 410 and 415 to identify the gaze direction of each eye. Each eye tracking block ("block") 430 (430A, 430B, and 430C) includes the capturing an image of the eye via right eye camera 410 (410A, 410B and 410C), communication 432 (432A, 432B, and 432C) is the transmission via a communication interface of the image captured from the right eye camera 410 to the eye tracking engine 340, and the processing 434 of the image to determine the eye gaze direction. Similarly, block 431 (431A, 431B, and 431C) includes the capturing of an image of the eye via left eye camera 415 (415A, 415B, and 415C), communication 433 (433A, and 433B) is the transmission via a communication interface of the image captured from the left eye camera 415 to the eye tracking engine 340, and the processing 435 of the image to determine the eye gaze direction.

In certain embodiments, the communication 432 and 433 are transmitted via a singular communication interface. In certain embodiments, the communication 432 and 433 are transmitted via different communication interfaces. Similarly, in certain embodiments, processing 434 and 435 is performed by a camera specific processor within the eye tracking engine 340. Similarly, in certain embodiments, processing 434 and 435 is performed by the same processor within the eye tracking engine 340.

As depicted in FIG. 4B time 405 increases starting from time 420. At time 420, the block 430A initiates and right eye camera 410A commences to capture the position of the right eye. The right eye camera 410A concludes capturing the right eye at time 422 and the captured image is transmitted via communication 432A. When communication 432A concludes the processing 434A commences. Processing 434A identifies the gaze direction of the right eye. Block 430A concludes at time 440.

Midway through the capturing the right eye, at time 421, the block 431A initiates and left eye camera 415A commences to capture the position of the left eye. The left eye camera 415A concludes capturing at time 423, where the captured image is transmitted via communication 433A. When communication 433A concludes the processing 435A commences. Processing 435A identifies the gaze direction of the left eye. Block 431A concludes at time 442.

Upon right eye camera 410A completing the capture of an image of the right eye of the user, block 430B initiates, at time 422, and right eye camera 410B commences to capture the position of the right eye. It is noted that right eye camera 410A and right eye camera 410B are the same camera but notated differently to indicate a successive iteration the camera. The block 430B initiates and right eye camera 410B commences to capture the position of the right eye. The right eye camera 410B concludes capturing the right eye at time 424 and the captured image is transmitted via communication 432B. When communication 432B concludes the processing 434B commences. Processing 434B identifies the gaze direction of the right eye based on the image from right eye camera 410B. Block 430B concludes thereafter at time 444.

Upon left eye camera 415A capturing an image of the left eye of the user, block 431B initiates, at time 423, and left eye camera 415B commences to capture the position of the left eye. It is noted that left eye camera 415A and left eye camera 415B are the same camera but notated differently to indicate a successive iteration the camera. Midway through the capturing the right eye, at time 423, the block 431B initiates and left eye camera 415B commences to capture the position of the left eye. When the left eye camera 415B concludes capturing the captured image is transmitted via communication 433B. When communication 433B concludes, the processing 435B commences. Processing 435B identifies the gaze direction of the left eye. Block 431B thereafter.

Upon right eye camera 410B capturing an image of the right eye of the user, block 430C initiates, at time 424, and right eye camera 410C commences to capture the position of the right eye. It is noted that right eye camera 410A, camera 410B, and camera 410C are the same camera but notated differently to indicate a successive iteration the camera.

The processing of the images captured by each camera 410 and 415 to identify the gaze direction of each eye continues until the eye tracking engine 340 indicates that block 430 and 431 are to stop.

In certain embodiments, each block 430A, 430B or 430C occurs over a 8 ms time frame. For example, capturing the right eye via right eye camera 410 takes 5 ms, transmitting the captured image via communication 432 occurs in 1 ms, and the processing 434 to identify the gaze direction of the right eye occurs over 2 ms. Similarly, the blocks 431A and 431B occur over a 8 ms time frame. For example, capturing the left eye via left eye camera 415 takes 5 ms, transmitting the captured image occurs via the communication 433 takes 1 ms, and the processing 435 to identify the gaze direction of the left eye occurs over 2 ms.

The time lapse 409 indicates the time difference between eye tracking engine 340 identifying the gaze direction of the right eye and identifying the gaze direction of the left eye. According to the previous example, the time lapse 409 is 2.5 ms. Time lapse 407 indicates the time difference between each activation of the right eye camera 410. Similarly, if right eye camera 410 takes 5 ms to capture an image of the right eye, then time lapse 407 is also 5 ms. In certain embodiments, the time difference between the start of right eye camera 410A at time 420 and the start of left eye camera 415A at time 421 is 2.5 ms.

Figure 5:
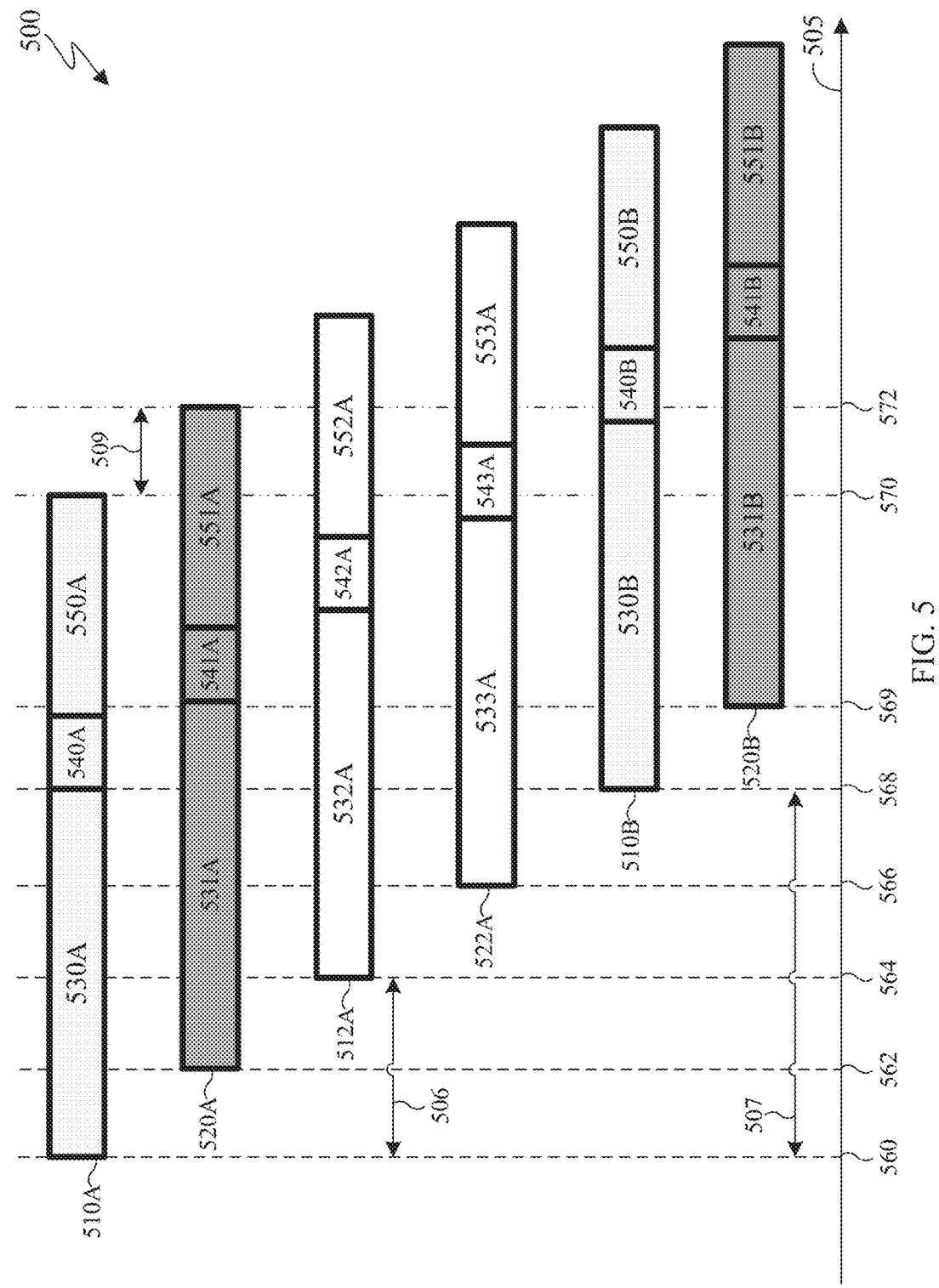
FIG. 5 illustrates an example graphical representation of a staggering effect of four eye cameras in accordance with embodiments of the present disclosure.

FIG. 5 illustrates an example graphical representation of a staggering effect of four eye cameras in accordance with an embodiment of the present disclosure. FIG. 5 illustrates graph 500 depicting the staggering of a two right eye cameras 530 and 532 with two left eye cameras 531 and 533. Right eye cameras 530 and 532 are similar to right eye camera 410 of FIG. 4 and right eye camera 324 of FIG. 3. Left eye cameras 531 and 533 are similar to left eye camera 415 of FIG. 4 and left eye camera 322 of FIG. 3.

Graph 500 depicts the processing of the images captured by four cameras 530 (530A and 530B), 531 (531A and 531B), 532 (532A), and 533 (533A) to identify the gaze direction of each eye. It is noted that cameras 530A and 530B resent a singular camera capturing sequential instances of the position of the right eye. Similarly, cameras 531A and 531B resent a singular camera capturing sequential instances of the position of the left eye.

In certain embodiments, communication 540A, 540B represent different instances of a singular communication of an image captured from the first right eye camera 530 to the eye tracking engine 340. In certain embodiments, communication 541A, 541B represent different instances of a singular communication of an image captured from the first left eye camera 531 to the eye tracking engine 340. In certain embodiments, communications, 540A, 541A, 542A, 543A, 540B, and 541B are transmitted via a singular communication interface. In certain embodiments, communications, 540A, 541A, 542A, 543A, 540B, and 541B are transmitted via different communication interfaces.

In certain embodiments, eye tracking engine 340, of FIG. 3 has a single processor associated with each camera. In certain embodiments, eye tracking engine 340, of FIG. 3 has multiple processors associated with each camera. For example, processing 550A and 550B represent different instances of identifying the right eye gaze from an image captured by the first right eye camera 530, via a single processor of the eye tracking engine 340. In another example, processing 550A and 550B represent different instances of identifying the right eye gaze from an image captured by the first right eye camera 530, via a different processors of the eye tracking engine 340.

Graph 500 depicts the processing of the images captured by each camera 530, 531, 532, and 533 to identify the gaze direction of each eye. Each eye processing block ("block") 510 (510A and 510B), 520 (520A and 520B), 512 (512A), and 522 (522A) includes the capturing an image of the of the eye via camera (such as eye camera 530, 531, 532, or 533), the communication (such as 540, 541, 542, or 543) of the captured image via a communication interface to the eye tracking engine 340 of FIG. 3 for processing (such as 550, 551, 552, or 553) to determine the eye gaze direction. For example, block 510A and 510B includes the capturing an image of the right eye via the first right eye camera 530 (530A and 530B, respectively), then the image are transmitted through a communication interface via communication 540 (540A and 540B, respectively), to the eye tracking engine 340 for processing 550 (550A and 550B, respectively).

As depicted in FIG. 5 time 505 increases starting from time 560. At time 560 the block 510A initiates and the first right eye camera 530A commences to capture the position of the right eye. The first right eye camera 530A concludes capturing the right eye at time 568 and the captured image is transmitted via communication 540A. When communication 540A concludes, the processing 550A commences. Processing 550A identifies the gaze direction of the right eye. Processing 550A concludes at time 570.

At time 562, the block 520A initiates and the first left eye camera 531A commences to capture the position of the left eye. The first left eye camera 531A concludes capturing at time 569, where the captured image is transmitted via communication 541A. When communication 541A concludes, the processing 551A commences. Processing 551A identifies the gaze direction of the left eye. Processing 551A concludes at time 572.

At time 564 the block 512A initiates and the second right eye camera 532A commences to capture the position of the right eye. When the second right eye camera 532A concludes capturing the right eye the captured image is transmitted via communication 542A. When communication 542A concludes, the processing 552A commences. Processing 552A identifies the gaze direction of the right eye. Processing 552A concludes thereafter.

At time 566, the block 522A initiates and the second left eye camera 533A commences to capture the position of the left eye. When the second left eye camera 533A concludes capturing, the captured image is transmitted via communication 543A. When communication 543A concludes, the processing 553A commences. Processing 553A identifies the gaze direction of the left eye. Processing 553A concludes thereafter.

At time 568, the block 510B initiates and the first right eye camera 530B commences to capture a second position of the right eye. When the first right eye camera 530B concludes capturing, the captured image is transmitted via communication 540B. When communication 540B concludes, the processing 550B commences. Processing 550B identifies a second gaze direction of the right eye. Processing 550B concludes thereafter.

At time 569, the block 520B initiates and the first left eye camera 531B commences to capture a second position of the left eye. When the first left eye camera 531B concludes capturing, the captured image is transmitted via communication 541B. When communication 541B concludes, the processing 551B commences. Processing 551B identifies a second gaze direction of the left eye. Processing 551B concludes thereafter.

In certain embodiments, each block 510, 512, 520, and 522 occurs over a 8 ms time frame, similar to blocks 430A, 431A, 430B, 431B and 430C of FIGS. 4A and 4B. For example, capturing the eye first right eye via camera 530A takes 5 ms, transmitting the captured image via communication 540A occurs in 1 ms, and the processing 550A to identify the gaze direction of the right eye occurs over 2 ms. Due to the additional eye cameras and the staggering effect, the time between each instance of the first right eye camera 530A and 530B, is the same as in FIG. 4B, that of time lapse 507 (in this example is 5 ms). By adding the second right eye camera 532A, the right eye can be captured twice as often. That is, instead of waiting time lapse 507 (time lapse 407 of FIG. 4B) between each capture of the right eye, the eye tracking engine 340 only waits time lapse 506 (in this example is 2.5 ms) between each image of the right eye. Similarly, the time lapse 509 (similar to time lapse 409 of FIG. 4B) indicates the time difference between eye tracking engine 340 identifying the gaze direction of the right eye and identifying the gaze direction of the left eye. In this example, the time lapse 509 is 1.25 ms, compared to time lapse 409 that was 2.5 ms, based on the same time durations of each component. Therefore adding additional cameras increases the speed of the eye tracking, thereby improving and increasing the accuracy of tracking each eye of a user. The processing of the images captured by each camera 530, 531, 531, and 533 to identify the gaze direction of each eye continues until the eye tracking engine 340 indicates a stop.

Figure 6A:
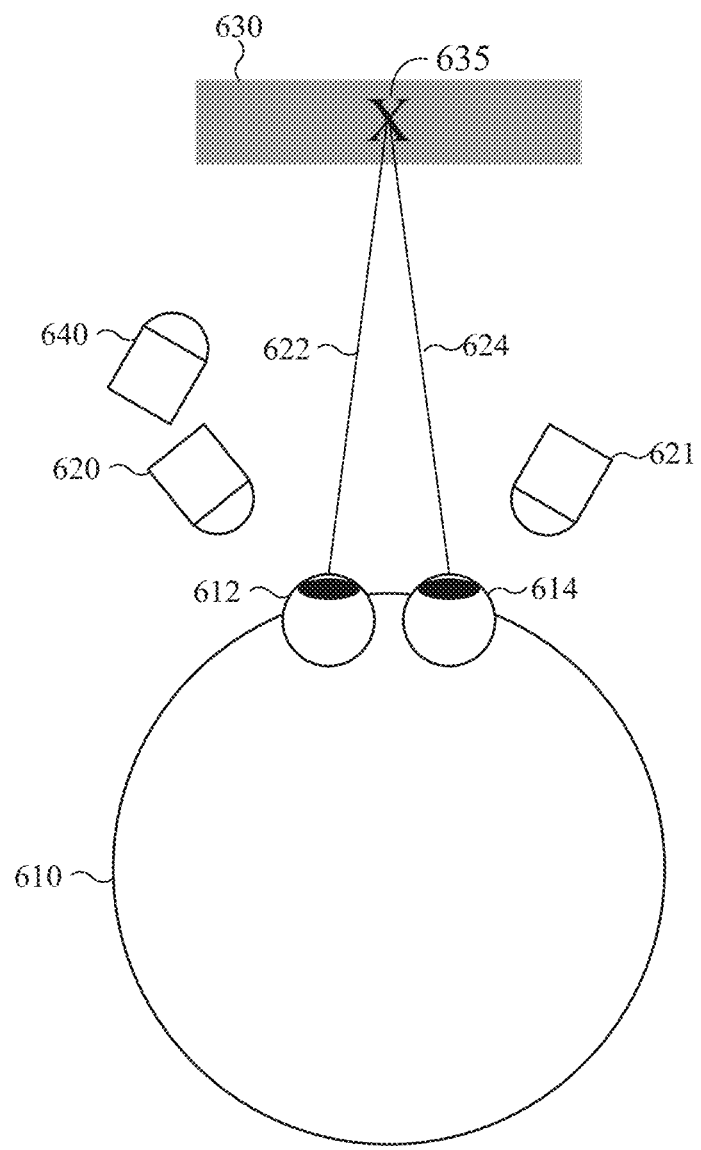
FIG. 6A, illustrates an example calibration process in accordance with embodiments of the present disclosure.
Figure 6C:
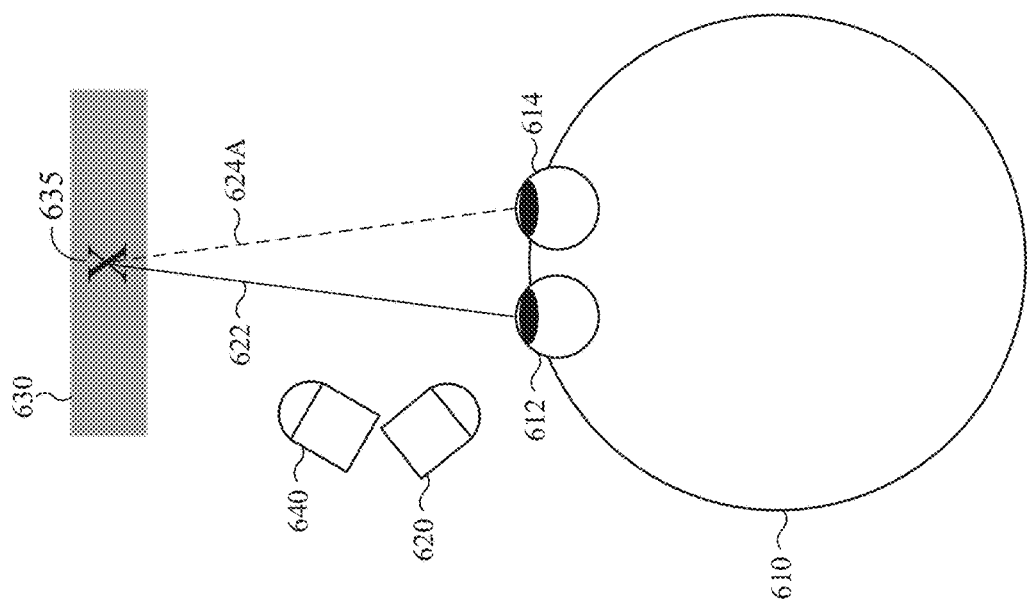
FIGS. 6B, and 6C illustrates an example mapping process in accordance with embodiments of the present disclosure.
Figure 6B:
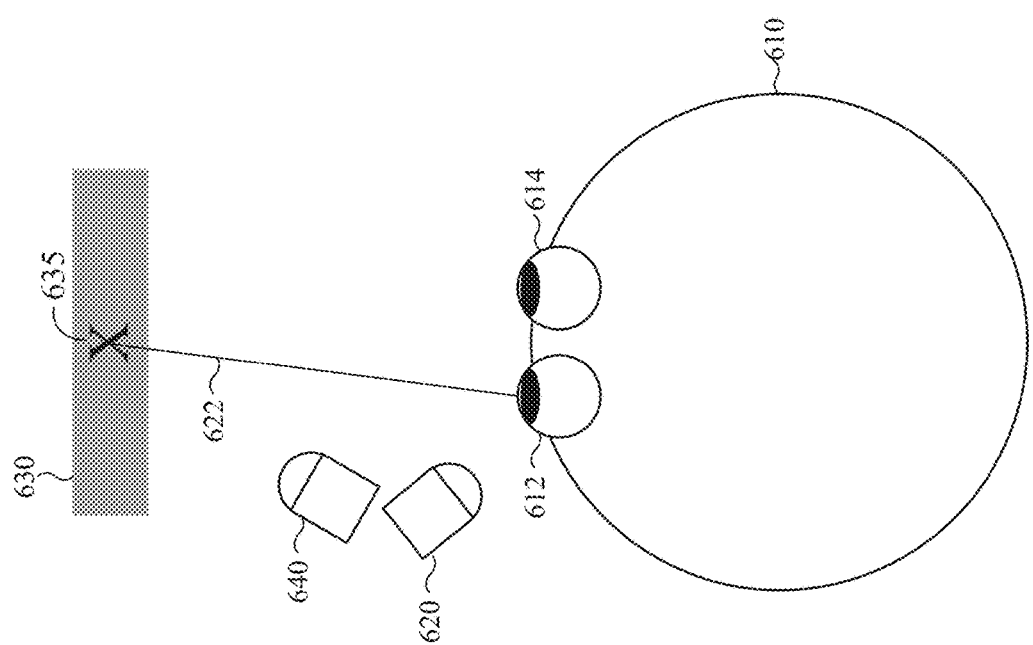

FIG. 6A, illustrates an example calibration process in accordance with an embodiment of the present disclosure. FIGS. 6B and 6C illustrate an example mapping process in accordance with an embodiment of the present disclosure. FIGS. 6A, 6B, and 6C depict identifying the first gaze direction with respect to a display. Left eye camera 620 is similar to left eye camera 322 of FIG. 3 and left eye camera 514 of FIGS. 4A and 4B. Right eye camera 621 is similar to right eye camera 324 of FIG. 3 and right eye camera 410 Of FIGS. 4A and 4B. World camera 640 is similar to world camera 326 of FIG. 3.

FIG. 6A illustrates the calibration processes to determine the focus distance of a left eye 612 and a right eye 614 of a user 610. During the calibration process the left eye camera 620 and the right eye camera 621 capture the eye gaze simultaneously of the user 610. In certain embodiments, the calibration is conducted through binocular eye tracking. During the calibration, the left eye camera 620 and the right eye camera 621 are not staggered. The left eye 612 and the right eye 614 view the display 630. The world camera 640 captures the display 630 as well. Object 635 is the object of the eye gaze of the user. The eye tracking engine 340 estimates a mapping between the left eye 612 and right eye 614. To calibrate the each eye camera (left eye camera 620 and the right eye camera 621) the eye tracking engine 340 derives a coefficient of the mapping between the left eye 612 and the right eye 614. In certain embodiments, the mapping can be fixed between the left eye camera 620, the right eye camera 621 with respect to the world camera 640. In certain embodiments, the world camera 640 is omitted if there is no need to derive a focal distance of the user 610. For example, the mapping of the left eye 612 and the right eye 614 can be implemented without the world camera 640 when deriving the focal distance is not necessary for future applications.

FIGS. 6B and 6C illustrate the process of identifying the eye gaze when the left eye camera 620 and the right eye camera 621 (of FIG. 6A) are staggered. The right eye camera 621 is not depicted in FIGS. 6B and 6C as FIGS. 6B and 6C depict an instantaneous moment in time, when the only the left eye camera 620 is capturing an image cameras and the right eye camera 621 is not capturing an image.

FIG. 6B illustrates left eye camera 620 capturing the position of the left eye 612 of the user 610. The eye tracking engine 340 identifies the eye gaze 622 of the left eye towards object 635. In certain embodiments, when the focal distance is necessary, the world camera 640 is activated to capture the display 630.

FIG. 6C illustrates the eye tracking engine 340 mapping the eye gaze 624A of the right eye 614. Eye gaze 624A of the right eye 614 is an estimation of the eye gaze of the user 610. When the focal distance is necessary, the world camera 640 is activated to capture the display 630. Based on the image captured by the world camera 640, eye tracking engine 340 identifies where the eye gaze 622 and the eye gaze 624A intersect. The distance the eye gaze 622 and 624A intersect is the distance of the eye focus of the user 610.

Figure 7:
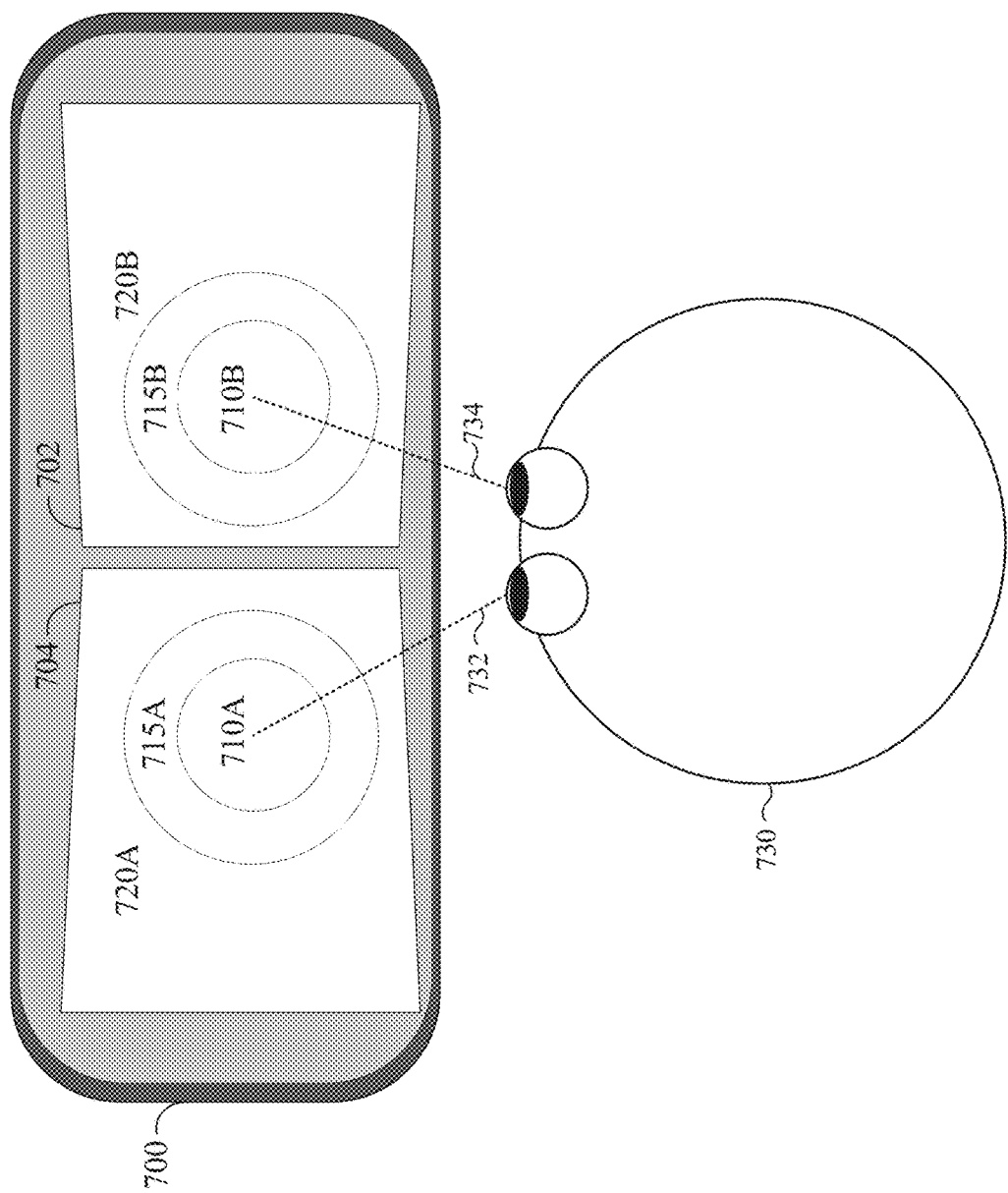
FIG. 7 illustrates an example foveated rendering in accordance with embodiments of the present disclosure.

FIG. 7 illustrates an example foveated rendering in accordance with an embodiment of the present disclosure. Foveated rendering renders different resolutions to different areas of the display based on the eye gaze of the user. Foveated rendering increases the resolution in areas on a display where the eye gaze of the user is located. For example, a user 730 views a HMD 700 with a left eye display 704 and a right eye display 702. The left eye gaze 732 is at area 710A. The right eye gaze 734 is at area 710B. Therefore, areas 710A and 710B are depicted with a high resolution. Areas 715A and 715B, are a slightly lower resolution as areas 715A and 715B, are located just outside of the eye gaze area. Similarly, areas 720A and 720B have the lowest resolution as areas 720A and 720B are located the furthest from the eye gaze. In certain embodiments, more or less concentric circles can be used for foveated rendering. In certain embodiments, other shapes can be used for foveated rendering. As the eyes of the user moves across the display 702 and 704, the location of each rendering area moves accordingly.

Figure 8:
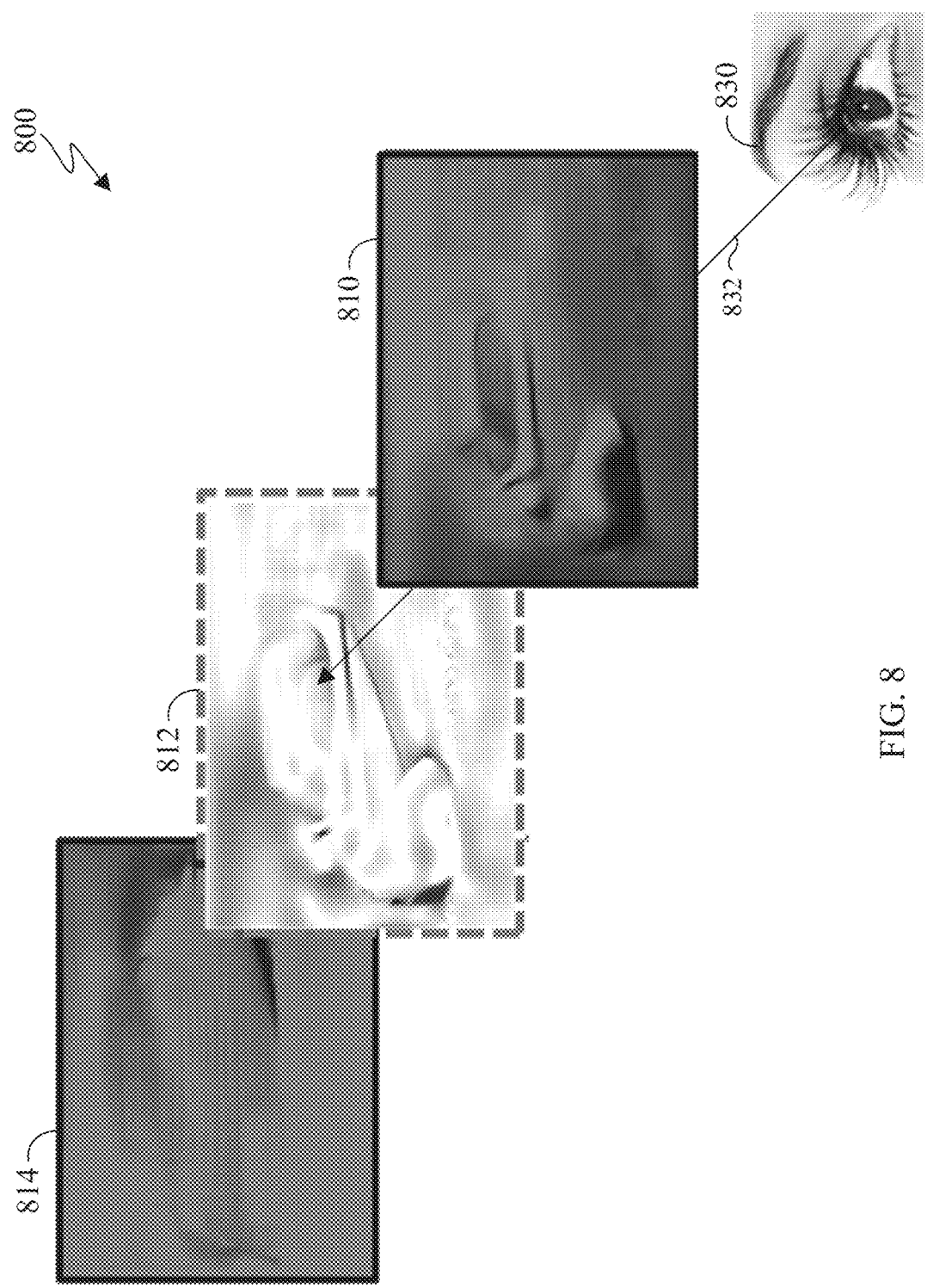
FIG. 8 illustrates an example multi-focal plane display in accordance with embodiments of the present disclosure.

FIG. 8 illustrates an example multi-focal plane display environment 800 in accordance with an embodiment of the present disclosure. Environment 800 depicts three multi-focal plane displays. Display 810 is closest to the user 830, and display 814 is the furthest from the user 830. Display 812 is located in between display 810 and display 814. Eye tracking engine 340 derives eye gaze 832 of the user 830, based on one or more eye cameras. Thereafter, the eye tracking engine 340 derives the focal distance of user based on the world camera. When the eye tracking engine 340 determines that the focal distance is on display 812, display 812 is activated and display 810 and 814 are deactivated. As the focal distance of the user 830 changes, display 814 or 810 is activated and display 812 is deactivated.

Figure 9:
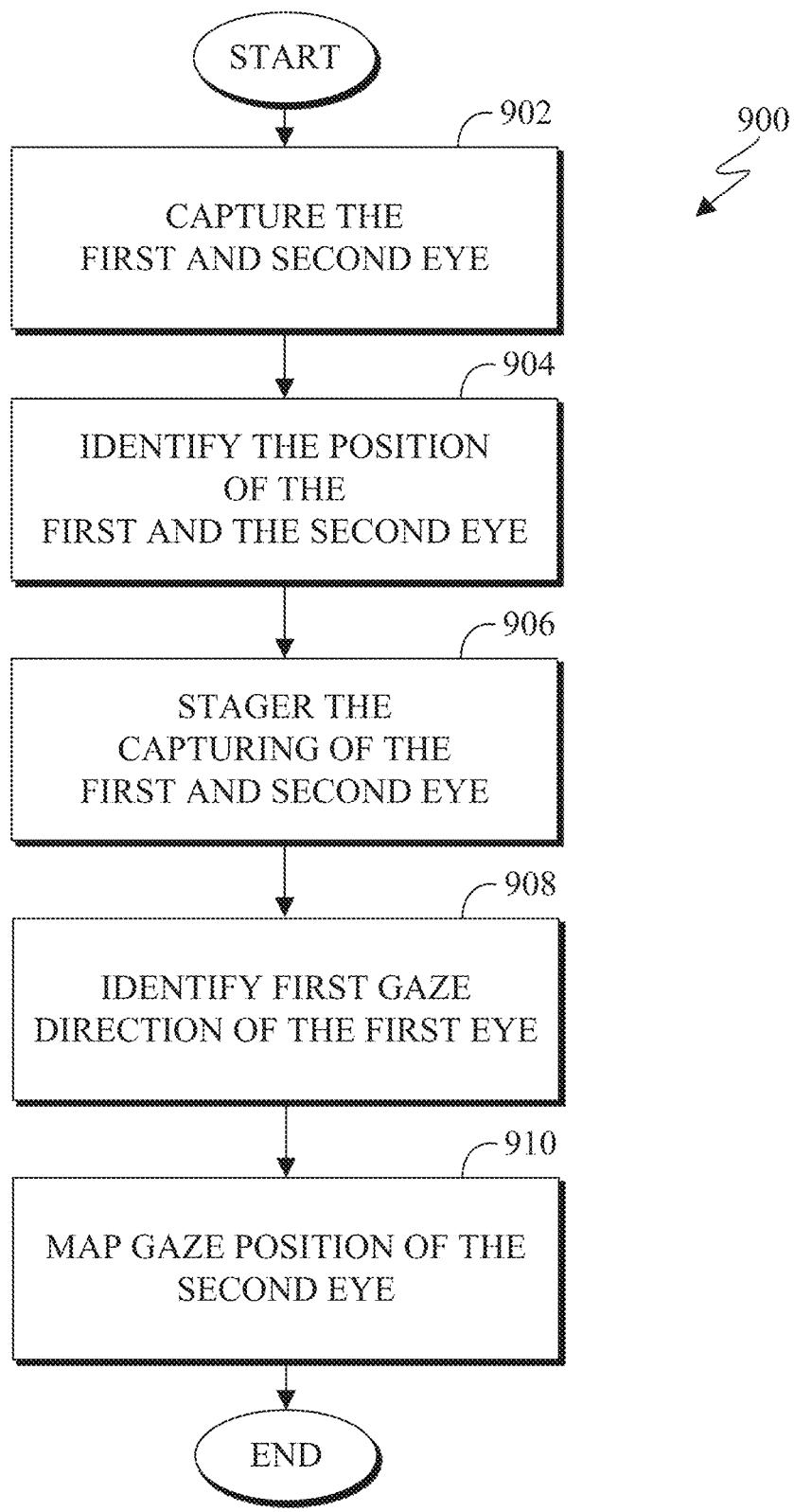
FIG. 9 illustrates an example method staggering eye tracking in accordance with embodiments of the present disclosure.

FIG. 9 illustrates an example staggered eye tracking method in accordance with an embodiment of the present disclosure. While process 900 depicts a series of sequential steps, unless explicitly stated, no inference should be drawn from that sequence regarding specific order of performance, performance of steps or portions thereof serially rather than concurrently or in an overlapping manner or performing of the steps depicted exclusively without the occurrence of intervening or intermediate steps. For ease of explanation, the method of determining an operation to perform based on contextual information is described with respect to the electronic device 200 of FIG. 2, and the HMD 300 of FIG. 3 however the process 900 can be used with any suitable system.

In block 902, eye tracking engine 340 instructs a left eye camera and a right eye camera to capture the right and left eye of a user. In certain embodiments, multiple left eye cameras are present to capture the left eye and multiple right eye cameras are present to capture the right eye.

In block 904, the eye tracking engine 340 identifies a position of the right eye and left eye of the user. The position of each eye indicates a gaze direction of each eye. For example, the position of the right eye, indicates the gaze direction of the right eye. Similarly, the position of the left eye, indicates the gaze direction of the left eye.

In block 906, the eye tracking engine 340 instructs the left eye camera and the right eye camera to stagger the capturing of the right eye and the left eye of the user. For example, the right eye is captured before the left eye. In another example, the left eye is captured before the right eye. When multiple right eye cameras and left eye cameras are present, the eye tracking engine 340 staggers and interleave each camera in a predefined order. For example, a first right eye camera, then the first left eye camera, then the second right eye camera, then the second left eye camera, followed by any additional cameras. Once each camera has captured an image of the respective eye, the order repeats.

In block 908 the eye tracking engine 340 identifies the first gaze direction. The first gaze direction is at a display or a real world object. The identified first gaze direction is based on the position of the first eye.

In block 910 the eye tracking engine 340 maps the gaze direction of the second eye based on the identified gaze direction of the first eye. For example, based on the line of sight vector identified in block 908, the eye tracking engine 340 can map a line of sight vector of the second eye. Mapping the gaze direction of the second eye occurs prior to capturing an image of the second eye. By on staggering the set of right eye cameras and left eye cameras, the eye tracking engine 340 estimates the gaze of each eye when that eye is not currently being captured. For example, when the left eye camera is capturing the left eye, the eye tracking engine 340 estimates and identifies the gaze direction of the right eye. Similarly, when the right eye camera is capturing the right eye, the eye tracking engine 340 estimates and identifies the gaze direction of the left eye.

In certain embodiments, a focus distance is derived based on the identified gaze direction of one eye and the estimated gaze direction of the other eye. The focus distance is derived at the distance from the user where the identified gaze direction of one eye and the estimated gaze direction of the other eye intersect. In certain embodiments, a relationship is generated between the eye cameras and a world camera, where the world camera captures what the user is viewing. The world camera is utilized in deriving the focal distance of the user.

Although the figures illustrate different examples of user equipment, various changes can be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for eye tracking, the method comprising:
capturing an image of a first eye and an image of a second eye, wherein the capturing of the image of the first eye and the capturing of the image of the second eye are staggered such that the capturing of the image of the first eye alternates with the capturing of the image of the second eye, and wherein the capturing of the image of the second eye begins before the capturing of the image of the first eye is completed; and
identifying a first position of the first eye and a second position of the second eye based on the images.

2. The method of claim 1, further comprising:
identifying a first gaze direction with respect to a display based on the identified first position of the first eye.

3. The method of claim 2, further comprising:
mapping a second gaze direction of the second eye based on the identified first gaze direction prior to the capturing of the image of the second eye.

4. The method of claim 3, further comprising:
deriving a focus distance of the first eye and the second eye based on the identified first gaze direction and the mapped second gaze direction.

5. The method of claim 4, wherein deriving the focus distance comprises identifying where the first gaze direction and the second gaze direction intersect.

6. The method of claim 4, wherein:
the display is a multi-focal plane display; and
the method further comprises:
activating a first display plane of the multi-focal plane display that corresponds to the derived focus distance of the first eye and the second eye; and
activating a second display plane of the multi-focal plane display that corresponds to a derived second focus distance of the first eye and the second eye.

7. The method of claim 3, further comprising:
rendering, on the display, at least two concentric areas of differing resolutions based on the identified first gaze direction or the mapped second gaze direction,
wherein an inner concentric area is a high resolution, and resolution decreases at each larger concentric area, and
wherein the inner concentric area matches the identified first gaze direction or the mapped second gaze direction.

8. The method of claim 3, wherein:
mapping the second gaze direction of the second eye comprises generating a relationship between at least one eye camera and a second camera,
the at least one eye camera captures the image of the first eye and the image of the second eye, and the second camera captures an image of the display, and
the relationship is established during a simultaneous capture of the images of the first eye and the second eye.

9. The method of claim 8, wherein the relationship between the at least one eye camera and the second camera is based on a coordinate system that is based on the second camera.

10. An electronic device comprising:
at least one camera configured to capture an image of a first eye and an image of a second eye, wherein the at least one camera is configured to stagger the capturing of the image of the first eye and the capturing of the image of the second eye such that the capturing of the image of the first eye alternates with the capturing of the image of the second eye, and wherein the at least one camera is configured to begin the capturing of the image of the second eye before the capturing of the image of the first eye is completed; and
a processor coupled to the at least one camera, the processor configured to identify a first position of the first eye and a second position of the second eye based on the images.

11. The electronic device of claim 10, wherein the processor is further configured to identify a first gaze direction with respect to a display based on the identified first position of the first eye.

12. The electronic device of claim 11, wherein the processor is further configured to map a second gaze direction of the second eye based on the identified first gaze direction prior to the capturing of the image of the second eye.

13. The electronic device of claim 12, wherein the processor is further configured to derive a focus distance of the first eye and the second eye based on the identified first gaze direction and the mapped second gaze direction.

14. The electronic device of claim 13, wherein the processor is further configured to identify where the first gaze direction and the second gaze direction intersect.

15. The electronic device of claim 13, wherein:
the display is a multi-focal plane display, and
the processor is further configured to:
activate a first display plane of the multi-focal plane display that corresponds to the derived focus distance of the first eye and the second eye; and
activate a second display plane of the multi-focal plane display that corresponds to a derived second focus distance of the first eye and the second eye.

16. The electronic device of claim 12, wherein:
the processor is further configured to render, on the display, at least two concentric areas of differing resolutions based on the identified first gaze direction or the mapped second gaze direction,
an inner concentric area is a high resolution, and resolution decreases at each larger concentric area, and
the inner concentric area matches the identified first gaze direction or the mapped second gaze direction.

17. The electronic device of claim 12, wherein:
the processor is further configured to generate a relationship between the at least one camera and a second camera,
the second camera is configured to capture an image of the display, and
the processor is configured to establish the relationship during a simultaneous capture of the images of the first eye and the second eye.

18. The electronic device of claim 17, wherein the relationship between the at least one camera and the second camera is based on a coordinate system that is based on the second camera.

19. A non-transitory computer readable medium embodying a computer program, the computer program comprising computer readable program code that when executed by a processor of an electronic device causes the processor to:
capture an image of a first eye and an image of a second eye, wherein the capturing of the image of the first eye and the capturing of the image of the second eye are staggered such that the capturing of the image of the first eye alternates with the capturing of the image of the second eye, and wherein the capturing of the image of the second eye begins before the capturing of the image of the first eye is completed; and
identify a first position of the first eye and a second position of the second eye based on the images.

20. The non-transitory: computer readable medium of claim 19, wherein the computer program further comprises computer readable program code that, when executed by the processor, causes the processor to identify a first gaze direction with respect to a display based on the identified first position of the first eye.

21. The non-transitory computer readable medium of claim 20, wherein the computer program further comprises computer readable program code that, when executed by the processor, causes the processor to map a second gaze direction of the second eye based on the identified first gaze direction prior to the capturing of the image of the second eye.

22. The non-transitory computer readable medium of claim 21, wherein the computer program further comprises computer readable program code that, when executed by the processor, causes the processor to derive a focus distance of the first eye and the second eye based on the identified first gaze direction and the mapped second gaze direction.

23. The non-transitory computer readable medium of claim 22, wherein the computer program further comprises computer readable program code that, when executed by the processor, causes the processor to identify where the first gaze direction and the second gaze direction intersect.

24. The non-transitory computer readable medium of claim 22, wherein the computer program further comprises computer readable program code that, when executed by the processor, causes the processor to:
activate a first display plane of a multi-focal plane display that corresponds to the derived focus distance of the first eye and the second eye; and
activate a second display plane of the multi-focal plane display that corresponds to a derived second focus distance of the first eye and the second eye.

25. The non-transitory computer readable medium of claim 21, wherein the computer program further comprises computer readable program code that, when executed by the processor, causes the processor to render, on the display, at least two concentric areas of differing resolutions based on the identified first gaze direction or the mapped second gaze direction,
wherein an inner concentric area is a high resolution, and resolution decreases at each larger concentric area, and
wherein the inner concentric area matches the identified first gaze direction or the mapped second gaze direction.

26. The non-transitory computer readable medium of claim 21, wherein the computer program further comprises computer readable program code that, when executed by the processor, causes the processor to generate a relationship between at least one eye camera and a second camera,
wherein the at least one eye camera captures the image of the first eye and the image of the second eye, and the second camera captures an image of the display, and
wherein the relationship is established during a simultaneous capture of the images of the first eye and the second eye.

* * * * *